United States Patent [19]

Leitheiser et al.

[11] 4,078,015
[45] Mar. 7, 1978

[54] COPOLYMERIZABLE COMPOSITIONS AND METHOD OF MAKING THE SAME

[75] Inventors: Robert H. Leitheiser, Crystal Lake, Ill.; John J. Szwarc, Saegertown, Pa.

[73] Assignee: Freeman Chemical Corporation, Port Washington, Wis.

[21] Appl. No.: 751,596

[22] Filed: Dec. 17, 1976

Related U.S. Application Data

[63] Continuation-in-part of Ser. No. 544,967, Jan. 29, 1975, abandoned, which is a continuation-in-part of Ser. No. 320,685, Jan. 2, 1973, abandoned.

[51] Int. Cl.² .............................................. C08G 18/67
[52] U.S. Cl. .......................... 260/859 R; 260/77.5 CR; 560/24; 560/25; 560/26; 560/157
[58] Field of Search .................. 260/77.5 CR, 859 R, 260/471 C, 482 B

[56] References Cited

U.S. PATENT DOCUMENTS

| | | | |
|---|---|---|---|
| 3,297,745 | 1/1967 | Fekete | 260/471 C |
| 3,891,523 | 6/1975 | Hisamatsu | 260/859 R |
| 3,907,751 | 9/1975 | Knight | 260/859 R |
| 3,991,024 | 11/1976 | Nakamoto | 260/77.5 CR |

*Primary Examiner*—Paul R. Michl
*Attorney, Agent, or Firm*—Harry B. Keck; George E. Manias

[57] ABSTRACT

Useful copolymerizable compositions include 10 to 50 parts by weight of (I) a polymerizable diurethane monomer having the general formula

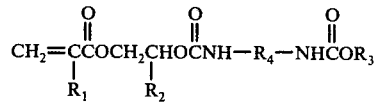

wherein
$R_1$ is —H; or —$CH_3$;
$R_2$ is —H; —$CH_3$; or —$C_2H_5$;
$R_3$ is an organic radical constituting the residue of a mono-hydroxy compound $R_3OH$ having from one to twelve carbon atoms; and
$R_4$ is a divalent organic radical constituting the residue of an organic diisocyanate $R_4$—$(NCO)_2$ from which the two isocyanate radicals have been removed;

and 90 to 50 parts by weight of (II) a polymerizable polyurethane monomer which is the reaction product of (a) an organic diisocyanate; (b) a beta-hydroxy alkyl ester of an acrylic acid; and (c) a polyol.

The compositions are molten at elevated temperatures, solid at room temperature, yet polymerizable in the solid state when exposed to ultraviolet light in the presence of a suitable photo-initiator for polymerization, and thus are useful in preparing printing press blanks and plates.

The compositions can be prepared in situ with the two monomers (I) and (II) in the desired proportions by a unique sequential process.

11 Claims, No Drawings

COPOLYMERIZABLE COMPOSITIONS AND METHOD OF MAKING THE SAME

CROSS-REFERENCES TO RELATED APPLICATIONS (IF ANY)

This application is a continuation-in-part of our co-pending application Ser. No. 544,967 filed Jan. 29, 1975, now abandoned which is in turn a continuation-in-part of our application Ser. No. 320,685 filed Jan. 2, 1973, now abandoned.

BACKGROUND OF THE INVENTION

1. Field of the Invention

Polymerizable compositions which are solids at room temperature including at least two monomers each having at least one acrylic terminal group and each containing at least two interior urethane linkages.

2. Description of the Prior Art

Copolymerizable polyacrylic-urethane monomers are described in U.S. Pat. No. 3,297,745 FEKETE et al. Copolymerizable monoacrylic-urethane monomers with isocyanate-terminal groups are described in British patent 1,223,688, in U.S. Pat. No. 2,958,704 DINBERGS et al and in U.S. Pat. No. 3,891,523 HISAMATSU et al.

SUMMARY OF THE INVENTION

The present copolymerizable mixture can be maintained as a polymerizable liquid at temperatures in the range of 50°-120° C, preferably about 75°-100° C. Above about 120° C the composition will commence to gel as a consequence of heat alone. The composition can be handled, poured, shaped as a liquid and allowed to cool and harden to a pliable solid at room temperature without experiencing polymerization. Thereafter the composition can be cured when exposed to ultraviolet radiation so long as a suitable ultraviolet photo-initiator is included in the mixture.

The two ingredients of the copolymerizable mixture are (I) 10 to 50 parts by weight of an acrylate diurethane polymer substantially free of unreacted —NCO groups and (II) 90 to 50 parts by weight of a polyacrylate polyurethane monomer formed by combining a beta-hydroxy alkyl acrylate with a polyisocyanate and a polyol. Adjusting the proportion of acrylate diurethane monomer (I) to the polyacrylate monomer (II) provides a means for determining the hardening temperature of the composition. Proper selection of the polyisocyanate and the polyol ingredient of the polyacrylic polyurethane monomer (II) provides a means for regulating the brittleness or resiliency of the hardened polymerizable composition.

There are two alternative methods proposed for preparing the present compositions in situ where both of the monomers I and II are formed from a diisocyanate. The beta-hydroxy alkyl acrylate is combined mol-for-mol with the diisocyanate to produce a first intermediate product which is a monoacrylicmonourethane, isocyanate-terminated adduct. A sufficient amount of polyol is added to this intermediate product to produce the desired quantity of the polyacrylic polyurethane monomer. Thereafter the residual first intermediate product is capped with a mono-hydroxy compound, such as phenol or a lower alkyl alcohol. Methanol is preferred. The reactants are combined such that the resulting polymerizable composition is substantially free of unreacted isocyanate groups and unreacted hydroxy groups. The polyisocyanate preferably is toluene diisocyanate or some other diisocyanate such as phenylene diisocyanate; diphenyl methane diisocyanate; dicyclohexylmethane diisocyanate; xylidene diisocyanate; isophorone diisocyanate; lysine diisocyanate; hexamethylene diisocyanate.

The mono-hydroxy compound which is utilized for capping the residual first intermediate product may be at least in part a hydroxy alkyl ester of a carboxylic acid and specifically a beta-hydroxy ester of an acrylic acid which provides some diacrylate diurethane monomers in the resulting composition.

The beta-hydroxy alkyl ester of acrylic acid may be hydroxy-ethyl acrylate (HEA), hydroxy ethyl methacrylate (HEMA), hydroxy propyl acrylate (HPA) and hydroxy propyl methacrylate (HPMA). The preferred capping mono-hydroxy compound is methanol.

The preferred polyol for forming the polyacrylic polyurethane monomer is the hydroxy terminated polyester of adipic acid and diethylene glycol. Other hydroxy terminated polyesters also are useful such as: a polycaprolactone diol; polyesters formed by reaction of a dicarboxylic acid or acid anhydride with a glycol or with an alkylene oxide adduct of a glycol. Phthalic acid, isophthalic acid, adipic acid, maleic acid, oxalic acid, malic and succinic acid, itaconic acid, citraconic acid, and the like can be combined with glycols such as ethylene glycol, propylene glycol, butylene glycol, diethylene glycol, dipropylene glycol, dibutylene glycol, neopentyl glycol, alkylene oxide adducts of bisphenols, and the like. The polyol may be a polyalkylene oxide adduct of a glycol, such as polypropylene glycol.

While the compositions contain from 10 to 50 parts by weight of the acrylate, diurethane monomer and 90 to 50 parts by weight of the polyacrylate polyurethane monomer, the preferred compositions include from about 15 to 30 parts by weight of the acrylate, diurethane monomer and from 85 to 70 parts by weight of the polyacrylate, polyurethane monomer.

DESCRIPTION OF THE PREFERRED EMBODIMENT(S)

The polymerizable composition is prepared, preferably in situ, by adding a beta-hydroxy alkyl ester of an acrylic acid to an organic diisocyanate. The reaction kinetics of certain diisocyanates are such that one of the two -NCO groups of the diisocyanate selectively reacts with the beta-hydroxy alkyl ester before the other one, particularly in the case of toluene diisocyanate (TDI). This selective reaction effectively suppresses the formation of the diurethane adducts in the first stage and produces the mono-adduct almost quantitatively. Other diisocyanates, and particularly aliphatic diisocyanates, do not exhibit differential reaction rates for the two -NCO groups. With such diisocyanates, at least a portion of the catalyst is supplied initially. After the mono-adduct reaction is completed, the polyol is added along with suitable catalyst to combine with some of the mono-adduct. The temperature is increased to about 70° C. Thereafter a capping mono-hydroxy compound such as an aliphatic alcohol or a phenol is added to combine with any unreacted —NCO groups and to produce the acrylate diurethane monomer. A suitable vinyl polymerization inhibitor is added, usually from about 0.1 to about 2 percent by weight of the composition, for example, toluhydroquinone, hydroquinone monomethyl ether and the like.

The product preferably is prepared in the absence of solvents.

It is possible to prepare the monoacrylate diurethane monomer separately from the polyacrylate polyurethane monomer and to mix the two ingredients to obtain the useful polymerizable compositions of this invention. The polyacrylate polyurethane polymer has the following general formula

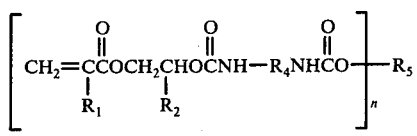

wherein $R_1$, $R_2$ and $R_4$ have the same significance already set forth and wherein $R_5$ is the residue of a hydroxy terminated polyester having the formula $R_5(OH)_n$; and wherein $n$ is 2 or 3. Typical hydroxy terminated polyesters $R_5(OH)_n$ include the reaction products of dicarboxylic acids and acid anhydrides with glycols and with the alkylene oxide adducts of glycols, as herein set forth.

One difficulty encountered in preparing the two monomers separately and thereafter mixing them is that the acrylate diurethane may have such a high melting temperature that the material gels before it will melt during the mixing process. The preferred in-situ preparation avoids the overheating gelation difficulty.

A preferred acrylate diurethane monomer, prepared from TDI, has the following general formula:

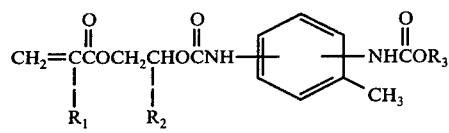

wherein
$R_1$ is —H; or —CH$_3$;
$R_2$ is —H; —CH$_3$ or —C$_2$H$_5$; and
$R_3$ is an organic radical constituting the residue of a mono-hydroxy compound $R_3$OH, having from one to twelve carbon atoms.

Another preferred monoacrylate diurethane monomer employs MDI (diphenylene methane diisocyanate) and the resulting monomer has the general formula:

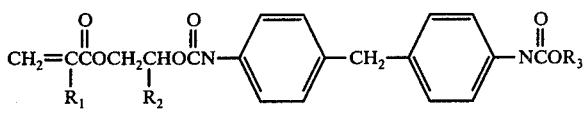

A further preferred monoacrylate dimethane monomer employs dicyclohexyl methane diisocyanate and the resulting monomer has the following general formula:

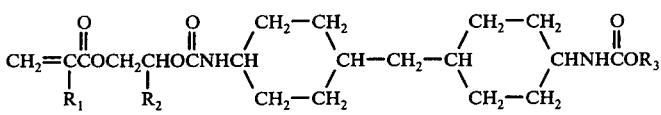

EXAMPLE 1

348 grams TDI (mixture of 2,4-TDI and 2,6-TDI) is introduced into a reaction flask and heated to about 50° C. 288 grams of hydroxy propyl methacrylate is added dropwise to the flask over a period of 100 minutes. Thereupon the flask is heated at 50° C and agitated for 35 minutes. 70 drops of dibutyl tin dilaurate is added and the reaction flask is heated to 70° C. 64 grams of methyl alcohol is slowly added over a period of 65 minutes and the reaction flask is maintained at 70° C for an additional 105 minutes. Thereupon 0.70 grams of hydroquinone monomethyl ether is added and the reaction vessel is gradually cooled to about 60° C over the course of 70 minutes.

The product is collected and cooled in a suitable container.

EXAMPLE 2

174 grams TDI (a mixture of 2,4-TDI and 2,6-TDI) is heated to 50° C in a one-liter kettle fitted with a stirrer, thermometer, condenser and an additional funnel. 130 grams of hydroxy ethyl methacrylate is added slowly over a period of 13 minutes. The kettle is maintained at 50° C for 55 minutes at which time 30 drops of dibutyl tin dilaurate is added. Thereupon 32 grams of methyl alcohol is added over a period of 45 minutes at about 55° C. The reaction kettle is heated to 75° C for 75 minutes at which time 0.336 grams of hydroquinone monomethyl ether is added. The kettle is cooled to 55° C over a period of 80 minutes and the contents are collected in a suitable container.

The monomers of Examples 1 and 2 exhibit the temperature-viscosity characteristics set forth in the following TABLE I.

TABLE I

| Temperature-Viscosity Characteristics | | |
|---|---|---|
| TEMPERATURE | VISCOSITY - centipoises | |
| ° F | Example 1 | Example 2 |
| 120 | >5,000 | — |
| 150 | 5,000 | — |
| 175 | 1,705 | 5,000 |
| 180 | 1,775 | 4,200 |
| 185 | 1,600 | 3,450 |
| 190 | 1,300 | 3,050 |
| 195 | 1,070 | 2,600 |
| 200 | 750 | 2,250 |
| 205 | 435 | 2,000 |
| 210 | 297 | 1,225 |
| 215 | — | 600 |
| 215 | — | 465 |

From TABLE I, it can be appreciated the the polymerizable monomers of Examples 1 and 2 are fluid at elevated temperatures, yet essentially solids at room temperature. This characteristic property permits these monomers to be blended with polyacrylate-polyurethane monomers to provide non-tacky, solid polymerizable compositions at room temperature. These solid solutions of the present acrylate diurethane monomers with the polyacrylate polyurethane monomers can be formed into wax-like solid sheets and films which readily convert to polymerization products when exposed to actinic radiation, provided that suitable sensitizers, about 0.1 to 3.0 percent by weight, are incorporated into the materials, e.g., benzoin, 2-ethyl anthraquinone, naphthalene sulfonyl chloride, benzoin ethers.

The compositions also can be cured by electron-beam radiation as well as by free-radical initiated curing techniques.

EXAMPLE 3

A polymerizable monomer was prepared by heating 348 grams TDI (a mixture of the 2,4- and 2,6- isomers) to 50° C and adding 288 grams hydroxy propyl methacrylate (HPMA) over a period of about 90 minutes. The reaction product was maintained at 50° C for an additional 90 minutes at which time 216 grams of benzyl alcohol was added over a period of about 70 minutes. The product was heated to about 70° C for an additional 60 minutes and then cooled and collected in a container. The product was a clear yellow liquid. After cooling, the product was a viscous, almost solid, material which did not crystallize.

EXAMPLE 4

A polymerizable resin was prepared from a saturated polyester resin I (hereinafter described), toluene diisocyanate and hydroxypropyl methacrylate. The polyester resin I was prepared by combining 365 grams isophthalic acid with 297 grams 1,4-butanediol in the presence of 1.65 grams dibutyl tin oxide. The polyesterification was carried out in toluene as a solvent at about 175° to 180° C for about eight hours until the acid number reduced to about 4. The actual —OH number of the resin was 160 and the equivalent weight was 351, compared to a theoretical —OH number of 196 and a theoretical equivalent weight of 286.

The polyester resin I (175.5 grams) was combined with the reaction product of 87 grams TDI and 72 grams HPMA in a kettle. The contents were heated along with 0.835 gram triphenyl stibine and 41 drops of Trigonal-14 (butyl ether of benzoin) for about two hours at about 100° C. Thereafter the product was cooled and collected in a container.

EXAMPLE 5

The product of Example 4 (8.5 grams) was combined with the product of Example 2 (1.5 grams). One drop of Trigonal-14 (butyl ether of benzoin) was added to the 10 grams mixture. The composition was heated and melted and cast between two glass plates approximately one-eighth inch apart. The clear casting, between the glass plates, was exposed to two 360-watt mercury vapor lamps for 15 minutes, on one side only. Similar clear castings, when cooled to room temperature prior to curing, were tack-free and solid. The lamps were about six inches away from the near-glass plate. The casting cured at this exposure and exhibited a durometer hardness of 72, compared with a durometer hardness of 55 prior to cure.

EXAMPLE 6

The product of Example 4 (7 grams) were combined with the product of Example 2 (3 grams) along with one drop of Trigonal-14 (butyl ether of benzoin). The mixture was heated and melted and cast between two glass plates as in Example 5. The glass-plate casting was exposed as in Example 5. The durometer hardness of the cured casting was 75. The durometer hardness of the uncured casting was 20.

EXAMPLE 7

228 grams TDI was heated to 50° C in a reaction kettle and 188 grams HPMA was added slowly over a period of 75 minutes. Thereafter 312 grams of Niax-0210 (a polylactone diol) was added along with 0.79 gram of triphenyl stibine and 1.58 grams dibutyl tin dilaurate. The heating was continued at about 60° C for about 135 minutes. Thereupon 60 grams of benzyl alcohol was added and the kettle was maintained at about 60° C for about 50 minutes. Thereafter 0.79 gram of hydroquinone monomethyl ether was added along with 1.98 grams of Trigonal-14 (butyl ether of benzoin). The product was collected, cooled and exhibited a viscosity greater than two million centipoises at room temperature.

In general, the in situ preparation of the copolymerizable mixture involves a sequential process including:

STEP (a) — reacting an organic diisocyanate, preferably TDI, with a beta-hydroxy alkyl ester of an acrylic acid, mol-for-mol to produce a mono-adduct which is an isocyanate-terminated monourethane monoacrylate;

STEP (b) — reacting an excess of the mono-adduct of STEP (a) with a polyol to produce a mixture of (1) polyacrylate-polyurethane reaction product, substantially free of unreacted —NCO groups and (2) unreacted mono-adduct which was supplied in excess of the amount required to combine with the polyol;

STEP (c) — reacting the mixture resulting from STEP (b) with a mono-hydroxy compound to combine with the unreacted —NCO groups in the mixture to produce an overall copolymerizable mixture, substantially free of unreacted —NCO groups, containing the acrylate diurethane monomers and the polyurethane polyacrylate monomer. Preferably the mono-hydroxy compound is selected from the class consisting of alcohols, phenols, hydroxy-alkyl ethers and esters.

On cooling, this copolymerizable mixture hardens at room temperature to a wax-like solid.

EXAMPLE 8

An acrylate, diurethane monomer according to this invention was prepared from MDI which is diphenyl methane diisocyanate, hydroxy propyl methacrylate (HMPA) and methyl alcohol. 125 grams of MDI were heated in a reaction flask to 60° C. 20 drops of dibutyl tin dilaurate was added as a catalyst and thereafter 72 grams of HPMA was added dropwise over a period of 50 minutes. Thereafter 0.213 gram of triphenyl stibine ws added as a further catalyst. 16 grams of methyl alcohol was added over a period of 30 minutes while the temperature was increased from about 60° to 65° C. Thereupon 0.213 gram of hydroquinone monomethyl ether was added as an inhibitor and the reaction kettle contents were collected in a container.

A small amount of the product of Example 8 was spread over the bottom of an aluminum weighing dish. The product hardened to a tack-free composition almost immediately at room temperature.

EXAMPLE 9

A polymerizable composition was prepared by combining 9 grams of the acrylate diurethane monomer described in Example 8 with 21 grams of a polymer which is described as Resin 11 hereinafter in Example 11. The mixture was heated and melted to assure uniform mixing.

The mixture was spread on the bottom of an aluminum weighing dish and was found to be completely tack-free at room temperature.

A further sample of the mixture was sandwiched between two sheets of Mylar transparent film. The sandwich was exposed to ultraviolet radiation from two 360 watt mercury vapor lamps for approximately 16 minutes. The composition was thermoset and could not be melted with a heat gun.

EXAMPLE 10

The monomer described in Example 8 was prepared in situ in combination with a diacrylate in accordance with a preferred formulation process. Specifically the following ingredients were combined:

| | | |
|---|---|---|
| MDI (diphenyl methane diisocyanate) | 228 | grams |
| HPMA (hydroxy propyl methacrylate) | 131 | grams |
| Niax-0210 (polylactone polyol having average formula molecular weight of 830) | 200 | grams |
| Methyl alcohol | 13 | grams |
| Dibutyl tin dilaurate | 57 | drops |
| Triphenyl stibine | 0.572 | gram |
| Methyl ether of hydroquinone | 0.572 | gram |
| 2-ethylanthroquinone | 0.572 | gram |
| Mucochloric acid | 0.572 | gram |

The MDI was heated in a reaction flask to about 50° and the dibutyl tin dilaurate was added. Thereupon the HPMA was added drop-wise over a 35 minute period as the temperature rose to 55° C. Thereupon the triphenyl stibine was added along with 20 additional drops of dibutyl tin dilaurate and the Niax-0210 and the methyl alcohol. The mixture was cooked for about 35 minutes at about 70° C and recovered in a container.

The product contained a diurethane dimethacrylate and the monomer of this invention. Approximately 30 percent of the product was the monomer; the remaining 70 percent was the diurethane dimethacrylate.

A sample of the product was spread on the bottom of an aluminum weighing dish and cooled quickly. The composition appeared to be tacky.

EXAMPLE 11

Two separate isophthalic acid polyesters were prepared identified as Resin 11-A and Resin 11-B. The Resin 11-A was formed by polyesterifying 365 grams isophthalic acid with 297 grams 1,4-butane diol in the presence of 1.65 grams dibutyl tin oxide as a catalyst. The ingredients were cooked at 170°–180° C to an acid value of 4.15 and collected. The resin had a hydroxyl value of 160 (theoretical 196) and an equivalent weight of 351 grams (theoretical 286).

Resin 11-B was prepared by combining 497 grams isophthalic acid with 360 grams 1,4-butane diol in the presence of 2.15 grams dibutyl tin oxide. The ingredients were cooked at 170°–180° C to an acid value of 2.4 and showed a hydroxyl number of 60 and an equivalent weight of 935 grams.

Resin 11-C was prepared by heating 174 grams TDI to about 50° C and thereafter adding 130 grams HEMA and thereafter adding 32 grams methanol. The reaction kettle was maintained at about 50° to 75° C for about 3 hours and 0.336 grams of hydroquinone monomethyl ether was added. The product was collected in a container as Resin 11-C.

87 grams TDI was heated in a reaction kettle at 50° C. 72 grams HPMA was added over a period of about an hour at 50° C. Thereafter 105 grams of Resin 11-A and 187 grams of Resin 11-B were melted together at 137° C and poured into the reaction kettle wherein the temperature rose to about 120° C. At that point 0.451 grams triphenyl stibine was added along with 80 grams of Resin 11-C. Thereafter the reaction kettle was maintained at about 100° C for about 2 hours at which time 1.33 grams of butyl ether of benzoin was added and the resin was collected in a container and identified as Resin 11.

EXAMPLE 12

A monomer was prepared from Hylene-W, HPMA and methanol. Hylene-W is dicyclohexyl methane diisocyanate sold by E. I. du Pont de Nemours Company. The monomer was prepared by heating 264 grams Hylene-W to about 50° C and adding 144 grams HPMA (hydroxy propyl methacrylate) over a period of about 15 minutes. Thereafter 20 drops of dibutyl tin dilaurate was added and the reaction kettle contents were maintained at 50° for 3½ hours. At that time 0.44 gram triphenyl stibine was added. 32 grams of methanol was added drop-wise over a period of 45 minutes as the temperature was increased to about 75° C. The reaction kettle was maintained between 75° and 80° C for another 1 hour 45 minutes at which time the reaction kettle contents were collected and stored in a container.

A sample of this product was cooled on an aluminum dish to a hard solid substance having some tackiness at room temperature.

EXAMPLE 13

964 grams dicyclohexyl methane diisocyanate and 1.38 grams dibutyl tin dilaurate were placed in a reaction kettle and heated to 50° C. 424 grams HEA (hydroxyl ethyl acrylate) were added gradually over a period of 70 minutes as the kettle temperature remained at 50°–55° C. The kettle was maintained at 50° C for about 80 minutes and thereafter 4.58 grams dibutyl tin dilaurate was added along with 2.28 grams triphenyl stibine. Thereafter a total of 830 grams polylactone polyol (Niax 0210) was added in increments over a period of 25 minutes as the temperature increased to about 86° C. Thereafter 2.28 grams mucochloric acid and 54 grams methyl alcohol were added to 100° C. The reaction kettle was maintained at 100° C for ½ hour. Thereafter 2.28 grams of hydroquinone monomethyl ether and 2.2 grams of 2-ethyl-anthroquinone were added and the product was poured into containers.

The product, at room temperature, is solid and tack-free. The uncured solid had a durometer value of 12. When a sample of the material was cured by exposure to ultraviolet light through two glass plates, the cured product had a durometer value of 50.

EXAMPLE 14

The following ingredients were assembled for preparation of a polymerizable composition:

| | | |
|---|---|---|
| dicyclohexyl methane diisocyanate | 1061 | grams |
| hydroxy ethyl acrylate | 466.5 | grams |
| an adipate diethylene glycol polyester, molecular weight 1942 | 2427.5 | grams |
| methyl alcohol | 48.5 | grams |

The dicyclohexyl methane diisocyanate was heated to 50° C and combined with 4 grams triphenyl stibine and 4 grams dibutyl tin dilaurate representing 1000 parts per million based on the total anticipated charge to the reactor. Thereafter the hydroxy-ethyl-acrylate was slowly added to the reactor over a period of 1 hour 40 minutes at 50° C. At that point 0.4 gram toluhydroquinone was added representing 100 parts per million based on the total anticipated charge. The reactor was maintained at 50° C for 1 hour. Thereafter 4 grams dibutyl tin dilaurate was added along with one drop of a silicone anti-foaming agent.

Then the adipate diethylene glycol polyester was added over a 10 minute period at 50° C. The ingredients were heated to 85° and maintained for 1 hour. Thereafter the methyl alcohol was added slowly along with 0.4 gram toluhydroquinone. The reactor was maintained for 1 hour 40 minutes until infrared analysis showed less than 0.05 percent by weight —NCO groups. Thereafter 8 grams of 2-ethyl anthroquinone was added as a photoinitiator representing 2000 parts per million based on the total resin. The composition was dumped into Teflon coated pans and cooled in a dark cabinet.

The adipate diethylene glycol polyester was prepared by combining 6630 grams adipic acid, 5370 grams diethylene glycol and 12 grams dibutyl tin oxide. The reactants were cooked to a final acid value of 2.8 and a molecular weight of 1942.

The product of Example 14 was melted, degassed and rolled between two sheets of 10 mil polyester film to a 35 millimeter thickness while the composition was still hot. Thereafter the film was cured by exposure to two 200 watts/inch lamps in an Ashdee laboratory curing unit at 60 seconds/exposure. The film had a Shore A durometer of 73, a tensile strength of 529 psi and a tensile modulus of $0.0001 \times 10^6$.

EXAMPLE 15

The following ingredients were combined to produce the polymerizable composition of this invention.

| | | |
|---|---|---|
| dicyclohexyl methane diisocyanate | 8166.6 | grams |
| triphenyl stibine | 18.15 | grams |
| dibutyl tin dilaurate | 18.15 | grams |
| hydroxy ethyl acrylate | 4534.9 | grams |
| methyl alcohol | 105.3 | grams |
| adipate diethylene glycol polyester molecular weight 548 | 5343 | grams |

The dicyclohexyl methane diisocyanate was combined with the triphenyl stibine and dibutyl tin dilaurate and heated to 50° C. The hydroxy ethyl acrylate was added over a period of 1 hour 20 minutes as the temperature increased from 50° to 65° C. Thereafter 1.82 grams toluhydroquinone was added and the reactor was maintained at 60° C for 1 hour. Thereafter 18.15 grams dibutyl tin dilaurate was added along with the adipate diethylene glycol polyester. The reactor was maintained at 75° C for 1 hour and thereafter the methyl alcohol was added over a 15 minute period at 80° C. 1.82 grams additional toluhydroquinone was added and the reactor was maintained between 80° and 85° C for 1 hour 40 minutes. The infrared analysis indicated an —NCO content of 0.1 percent by weight. 18.15 grams ethyl anthroquinone was dissolved in 18.15 grams of tetraethylene glycol dimethacrylate and added to the reactor. The contents were stirred for 45 minutes at 85° C and poured into a silicone lined fiber drum.

The adipate diethylene glycol polyester of this example was prepared by combining 6031 grams adipic acid with 6600 grams diethylene glycol and 12.6 grams dibutyl tin oxide. The contents were cooked to an acid value of 2.0 and vacuum stripped to a final hydroxyl number of 205 and a molecular weight of 548. A film was prepared utilizing the product of this example in the manner described in Example 14. The film was cured in the same cure regimen and produced a film having a Shore D durometer of 80, a tensile strength of 6675 psi and a tensile modulus of $0.004 \times 10^6$.

EXAMPLE 16

The following ingredients were combined to produce a useful printing plate.

| | | |
|---|---|---|
| dicyclohexyl methane diisocyanate | 1,260 | grams |
| hydroxy ethyl acrylate | 541.8 | grams |
| Jefferson 2000 (a polypropylene glycol having a molecular weight of 2000) | 3,000 | grams |
| methanol | 57 | grams |

The dicyclohexyl methane diisocyanate was heated to 50° C along with 4.86 grams triphenyl stibine and 4.86 grams dibutyl tin dilaurate. The hydroxy ethyl acrylate was added over a period of 1 hour while the reaction contents were maintained at 50° C. Thereafter 0.486 gram toluhydroquinone was added and the reaction was maintained at 50° C for 1 hour. Thereafter 4.86 grams dibutyl tin dilaurate and the polypropylene glycol were added along with 3 drops of Dow Corning Antifoam-A. The reaction vessel was heated to 75° C and held for 1 hour. Thereafter the methanol was added slowly over a ½ hour period while the temperature was maintained at 75° C. An additional 0.486 gram toluhydroquinone was added and the reaction vessel was maintained at 75° C for 2.5 hours at which time an infrared analysis showed that the —NCO content was less than 0.5 weight percent. Thereupon 4.86 grams methyl ether of hydroquinone and 4.86 grams of 2-ethyl anthroquinone were dissolved in 10 grams of tetraethylene glycol dimethacrylate and the solution was added to the reaction kettle and stirred into the contents. The contents were poured into a Teflon lined can.

The resin sets up to a wax-like solid at room temperature having some surface tack. The resin, upon curing, is quite flexible. The resin can be cured under ultraviolet radiation and forms excellent printing press plates.

The cured sheets exhibit a tensile strength of 597 psi, a Shore-A durometer of 78 and a total elongation of 54 percent.

EXAMPLE 17

The following ingredients were combined to produce a useful flexible UV curable resin.

| | | |
|---|---|---|
| isophorone diisocyanate | 777.8 | grams |
| hydroxy ethyl acrylate | 488.4 | grams |
| Niax-0210 (a polycaprolactone diol) | 820 | grams |
| methanol | 51 | grams |

The isophorone diisocyanate was combined with 2.14 grams triphenyl stibine and 2.14 grams dibutyl tin dilaurate and heated to 50° C. The hydroxy ethyl acrylate was added slowly over a 1 hour period while the reaction vessel was maintained at 50° C. Thereafter 0.214 gram toluhydroquinone was added and the reaction kettle was maintained at 50° C for 1 hour. Thereafter 2.14 grams dibutyl tin dilaurate and 1 drop of Dow Corning Antifoam-A was added along with the polycaprolactone diol. The reaction kettle was heated to 75° C and held at that temperature for 1 hour at which time the methanol was added drop-wise over a period of 10 minutes. The reaction kettle was maintained at 75° C for 1 hour following the addition of 0.214 grams toluhydroquinone. At that time an infrared analysis showed the —NCO content to be less than 0.5 percent by weight. Thereupon 2.14 grams of 2-ethyl anthroquinone predissolved in 2.14 grams of tetraethylene glycol dimethacrylate was added to the reaction vessel contents which are stirred for ½ hour. At that point the contents were poured into a metal can for storage.

The material forms a soft tacky solid which can be cured readily under ultraviolet radiation.

We claim:

1. A copolymerizable composition, substantially free of unreacted isocyanate groups, said composition being a liquid at temperatures in the range 50°–120° C and being a solid at room temperature, including
(A) 10 to 50 parts by weight of a polymerizable acrylic diurethane monomer having the general formula

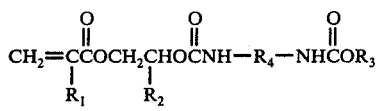

wherein
$R_1$ is —H or —$CH_3$;
$R_2$ is —H, —$CH_3$ or —$C_2H_5$;
$R_3$ is an organic radical constituting the residue of a lower alkyl alcohol $R_3OH$; and
$R_4$ is a divalent organic radical

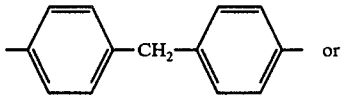 or

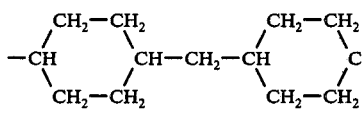

and
(B) 90 to 50 parts by weight of a polymerizable polyacrylic polyurethane monomer which is the reaction product of
(a) an organic diisocyanate $R_4$-$(NCO)_2$;
(b) a beta-hydroxy alkyl ester of an acrylic acid; and
(c) a diol.

2. The composition of claim 1 including 0.1 to 3.0 percent by weight of a sensitizer for actinic radiation.
3. The composition of claim 1 wherein the said diol is a polyester of adipic acid and diethylene glycol.
4. The composition of claim 1 wherein the said diol is a polycaprolactone diol.
5. The composition of claim 1 wherein the said polyacrylic-polyurethane monomer is the reaction product of
(a) dicyclohexyl-methane diisocyanate;
(b) a polyester of adipic acid and diethylene glycol;
(c) beta-hydroxy ethyl acrylate;
and
$R_1$ is —H; and $R_2$ is —H.
6. The method of preparing a copolymerizable mixture comprising:
(a) reacting organic diisocyanate, mol-for-mol with beta-hydroxy alkyl ester of an acrylic acid;
(b) reacting a polyol with an excess of the reaction product of STEP (a) to produce a mixture, substantially free of unreacted —OH grups containing the reaction product of the said polyol and the said reaction product of STEP (a) along with unreacted product of STEP (a);
(c) reacting the mixture resulting from STEP (b) with sufficient lower alkyl alcohol to combine with the unreacted —NCO groups in the mixture; and
(d) recovering a copolymerizable mixture substantially free of unreacted —NCO groups containing acrylate-diurethane monomers and polyurethane-polyacrylate monomers.
7. The method of claim 6 wherein
(A) the said organic diisocyanate is selected from the class consisting of diphenyl methane diisocyanate and dicyclohexyl methane diisocyanate;
(B) the said beta-hydroxy alkyl ester is selected from the class consisting of
(i) beta-hydroxy ethyl acrylate or methacrylate and
(ii) beta-hydroxy propyl acrylate or methacrylate;
(C) the said diol is selected from the class consisting of
(i) polycaprolactone ester diol and
(ii) hydroxy-terminated polyesters of polyhydric alcohols and polycarboxylic acids or polycarboxylic acid anhydrides.
8. The method of claim 7 including the additional STEP (e) of adding a sensitizer for actinic radiation to the copolymerizable mixture.
9. The method of claim 8 including the additional STEP (f) of forming the liquid copolymerizable mixture into flat sheets and recovering solid, tack-free sheets of a polymerizable composition.
10. The composition of claim 1 wherein the said diol is an alkylene oxide adduct of a glycol.
11. The composition of claim 10 wherein the said diol is polypropylene glycol.

* * * * *